(12) United States Patent
McMahon et al.

(10) Patent No.: US 6,488,114 B1
(45) Date of Patent: Dec. 3, 2002

(54) GRAIN CART

(75) Inventors: Randy McMahon, Lakeville, MN (US); Frank Bazzoli, Saint James, MN (US); Donald Marcy, Bingham Lake, MN (US); Trent J. Hoek, Mountain Lake, MN (US)

(73) Assignee: Balzer, Inc., Mountain Lake, MN (US)

( * ) Notice: Subject to any disclaimer, the term of this patent is extended or adjusted under 35 U.S.C. 154(b) by 0 days.

(21) Appl. No.: 09/781,777

(22) Filed: Feb. 12, 2001

(51) Int. Cl.$^7$ ................................................ B62D 12/00
(52) U.S. Cl. ...................... 180/414; 280/426; 180/411; 180/419
(58) Field of Search ................................ 280/442, 443, 280/419, 426; 180/411, 414, 403

(56) References Cited

U.S. PATENT DOCUMENTS

| | | | | |
|---|---|---|---|---|
| 3,593,890 A | * | 7/1971 | MacKinnon | 222/176 |
| 3,620,321 A | * | 11/1971 | Thibodeau | 180/41 |
| 3,874,530 A | * | 4/1975 | Purdy | 214/83.32 |
| 4,128,255 A | * | 12/1978 | Coldren | 280/143 |
| 4,365,841 A | * | 12/1982 | McLaughlin | 298/27 |
| 4,572,087 A | * | 2/1986 | Brannan | 111/56 |
| 4,982,976 A | * | 1/1991 | Kramer | 280/426 |
| 5,904,365 A | * | 5/1999 | Dillon | 280/419 |
| 6,131,691 A | * | 10/2000 | Morch | 180/418 |
| 6,135,484 A | * | 10/2000 | Lauronen et al. | 280/444 |
| 6,308,976 B1 | * | 10/2001 | Mitchell | 280/419 |

\* cited by examiner

*Primary Examiner*—Daniel G. DePumpo
*Assistant Examiner*—Tony Winner
(74) *Attorney, Agent, or Firm*—Nikolai & Mersereau, P.A.

(57) ABSTRACT

An improved grain cart is able to hold more grain with reduced field compaction to derive greater yield from a farm field. The grain cart includes a frame which supports a grain hopper and is supported by a plurality of wheels, some of which are steerable so the cart also has an acceptable turning radius.

2 Claims, 7 Drawing Sheets

GRAIN CART

BACKGROUND OF THE INVENTION

I. Field of the Invention

The present invention relates to grain carts used in harvesting grain crops. More specifically, the present invention relates to improvements to grain carts to increase the capacity of the grain cart and, at the same time, reduce compaction of the soil of the farm field in which the grain cart is used.

II. Description of the Prior Art

One of the factors that affect the yield of a farm field is the degree to which the soil in the field is compacted. The higher the degree of compaction, the lower the yield. The use of heavy farm equipment in a farm field can cause such compaction resulting in an adverse impact on the yield of the field.

A study was recently performed at Kansas State University relating to the effect of compaction resulting from farm equipment traversing a field. The results of the study suggests that if the farm equipment applies pressure to the soil in excess of 18 pounds per square inch, there is an adverse impact on the field's yield of up to 10% the next year.

Yield is, of course, only one factor that can be used in evaluating the efficiency of a farm operation. Another significant factor is the time it takes to plant a field, treat the field, and harvest the crop. In the past 50 years, the size and weight of farm equipment has grown significantly. Ideally, such equipment will be designed not only to reduce the time it takes to plant, treat or harvest a field, but also to reduce compaction of the field.

One important piece of equipment used in harvesting grain is the grain cart. Many grain carts made today include a single axle and a pair of wheels. These carts are typically designed to hold 500 to 800 bushels of grain. Other grain carts include a single axle and four wheels mounted to the axle. These carts are designed to hold up to 975 bushels of grain. There are two problems with such grain carts. First, they do not have a large enough capacity. Second, depending upon the load carried by the cart and the wheel size, the pressure applied by the cart to the field can be in the range of 25 pounds per square inch. This pressure exceeds that typical of tractors and various other equipment. The compaction created by such pressure is certainly great enough to adversely effect field yield.

SUMMARY OF THE INVENTION

The present invention provides a grain cart with an increased hauling capacity. At the same time, the grain cart of the present invention is designed to reduce the degree of compaction of the field by reducing the pressure applied by the cart to the field. Carts incorporating the present invention can have a capacity of up to 1500 bushels, and thus hold in excess of 50% more grain than prior art carts. At the same time, carts incorporating the present invention provide a maximum pressure to the field in the range of 13 to 15 pounds per square inch. Thus, carts of the present invention provide less compaction force than a typical tractor and less than the 18 pounds per square inch threshold referenced in the Kansas State University study.

The benefits of the present invention discussed above result from the use of either a tandem or tridem axle arrangement. In the tandem axle arrangement, the weight is distributed over two axles and four tires. In the tridem axle arrangement, the weight is distributed over three axles and six tires. In the tandem axle arrangement, the wheels on the back axle pivot so as to be steerable. The wheels on the front axle are not steerable. In the tridem axle arrangement, the wheels on both the front and back axles are steerable and the wheels on the center axle are not steerable. These arrangements allow the cart to have a turning radius approaching that of a single axle cart without the risk of damaging the axles, hubs, wheels and tires while turning. The steerable wheels steer in a controlled fashion. In one embodiment, this steering effect is the result of ground pressure. In another embodiment, a hydraulic power steering system is provided.

Other objects and advantages of the invention will become apparent from the following detailed description when read in conjunction with the accompanying drawings which set forth by way of illustration certain embodiments of the invention.

DETAILED DESCRIPTION OF THE PREFERRED EMBODIMENTS

Figure 1:
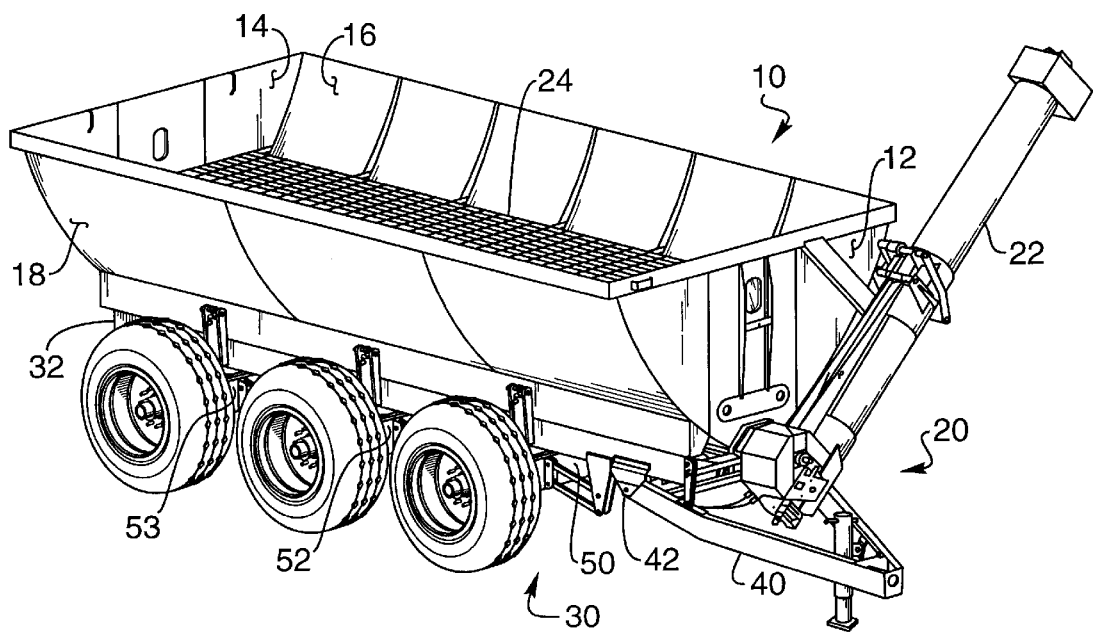
FIG. 1 is a perspective view of a tridem grain cart built in accordance with the present invention.

Grain carts made in accordance with the present invention all have various features in common. The first such feature is the hopper 10. As shown in FIG. 1, the hopper 10 has a front wall 12, a back wall 14, a pair of sloped side walls 16 and 18, and an open top. The cart is designed so that grain is deposited through the open top and flows toward the bottom.

A second feature common to each of the embodiments is a discharge auger assembly 20. A first auger (not shown) runs the length of the hopper 10 and carries the grain to a second auger 22 which is used to direct and carry the grain to the desired location during the unloading of grain from the hopper 10. Also located within the hopper 10 is a screen 24 covering the bottom of the hopper 10. Screen 24 serves at least two functions. It separates large debris from the grain. It also guards the auger to prevent injury.

The hopper 10 is mounted above a frame 30. The frame 30 shown in FIG. 2 includes a pair of longitudinal support members 32 and 34 which define first and second sides of the frame 30. Extending between the support members 32 and 34 are a plurality of cross members 36. One end of each cross member 36 is welded to longitudinal support member 32. The other end is welded to longitudinal support member 34. Two triangularly shaped gussets 38 and 39 help to secure each cross member 36 to the longitudinal support members 32 and 34 and strengthen the frame 30.

In each embodiment of the invention, a tongue 40 projects from the front of the frame 30. The tongue 40 is pivotally attached to each of the longitudinal support members 32 and 34 of the frame 30 by a pair of links 42 and 43. The tongue is used to hitch the grain cart to a tractor or other powered vehicle in a conventional manner.

In the tridem embodiment of the invention shown in FIGS. 1–4 three transverse axle support members 50, 52 and 53 are positioned below the frame 30. The transverse support members 50, 52 and 53 are each long enough to extend beyond the longitudinal support members 32 and 34. The manner in which each of the transverse axle support members 50, 52 and 53 is pivotally secured to the frame 30 will now be described.

Figure 2:
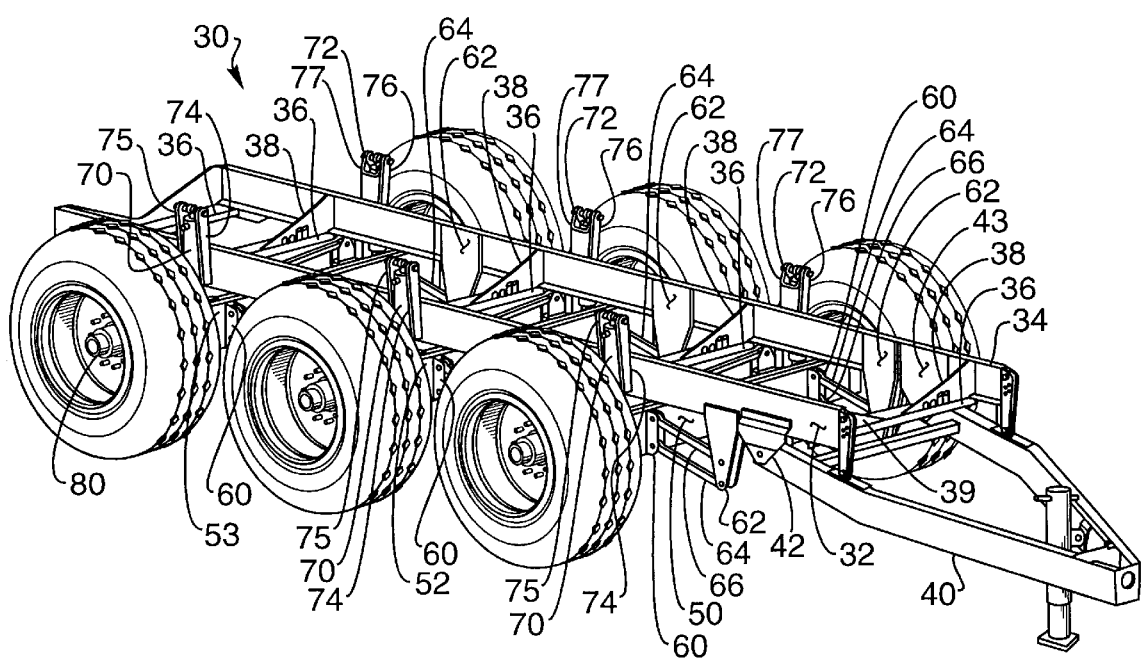
FIG. 2 is a perspective view of the tridem grain cart of FIG. 1 with the grain hopper removed to reveal the frame assembly of the grain cart.

As shown in FIG. 2, axle support member 50 has two pairs of mounting plates 60 projecting in a forward direction. The first pair of mounting plates 60 is positioned below the longitudinal support member 32. The second pair of mounting plates 60 is positioned below the longitudinal support member 34. Each longitudinal support member 32 and 34 has a pair of triangularly shaped brackets 62 extending downwardly at a position in front of the axle support member 50. Extending between each pair of mounting plates 60 and each pair of triangularly shaped brackets 62 are a pair of links 64 and 66. One end of each link 64 and 66 is positioned between and pivotally secured to the first pair of mounting plates 60. The other end of each link 64 and 66 is positioned between and pivotally secured to the pair of triangularly shaped brackets 62 projecting downwardly from longitudinal support member 32. Likewise, a link 64 and a link 66 are pivotally joined at their opposite ends to the second pair of mounting plates 60 and the triangularly shaped brackets 62 extending downwardly from longitudinal support member 34. In this fashion, the mounting plates 60, triangularly shaped brackets 62 and the links 64 and 66 cooperate to pivotally secure the axle support member 50 to each of the longitudinal support members 32 and 34. This same technique is used to pivotally join the other two axle support members 52 and 53 to the longitudinal support members 32 and 34.

Those skilled in the art will immediately recognize that a grain cart must be able to traverse rough terrain. Therefore, it is desirable to buffer the effect traversing the rough terrain would have on the cart and its load. Doing so vastly improves the stability and durability of the grain cart. In the present invention, these advantages are achieved in the following manner. Two hydraulic dampeners 70 and 72 dampen the movement of the frame relative to each axle support member 50, 52, and 53. For example, hydraulic dampener 70 is coupled to the axle support member 50 by a dampener bracket (not shown) and the other end of the hydraulic dampener 70 is coupled to longitudinal support member 32 by a pair of dampener arms 74 and 75. Similarly, one end of hydraulic dampener 72 is coupled to the axle support member 50 by a dampener bracket and the other end of hydraulic dampener 72 is coupled to longitudinal support member 34 by dampener arms 76 and 77.

As mentioned above, in the tridem embodiment shown in the drawings, the wheels mounted to axle support members 50 and 53 are steerable while the wheels mounted to axle support member 52 are not. More specifically, axle support member 52 has a stub axle 80 fixed to and projecting from each of its opposite ends. The stub axles 80 each include a hub 82. A wheel and tire are mounted to each of the hubs in a standard fashion.

Figure 3:
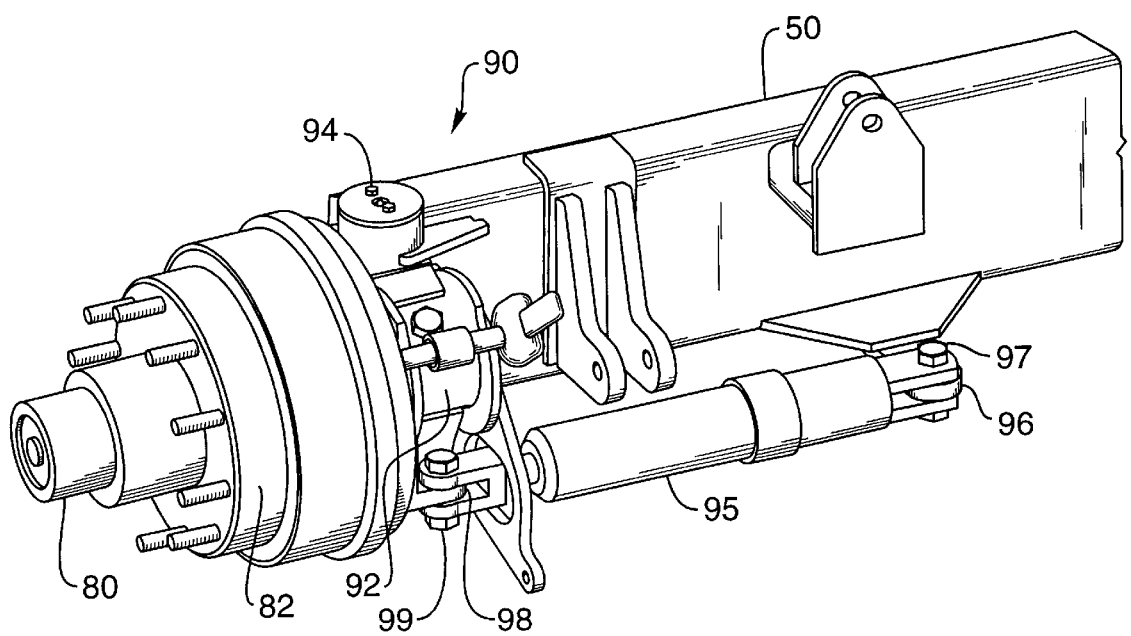
FIG. 3 is a perspective view showing an axle and wheel assembly of the type used to mount the front and back tires to the frame of the grain cart of FIG. 1.

FIG. 3 shows the manner in which a stub axle 80 is mounted to one of the axle support members 50 or 53 so that the wheels are steerable. As shown in FIG. 3, the mounting assembly 90 includes a stub axle 80 joined to the end of the axle support member 50 by a hinge assembly 94. Mounted to the stub axle 80 in a conventional fashion is the wheel hub 82. Given this arrangement, the stub axle 80 and hub 82 can partially revolve around the hinge assembly 94 to enable the wheel and tire mounted to the hub 82 to steer. To control the steering motion of the steerable stub axle 80 and wheel hub 82, a hydraulic cylinder 95 is provided. One end of the hydraulic cylinder 95 is coupled to the axle support member 50 by a first bracket 96 and pin 97. The other end of the hydraulic cylinder is coupled to the steerable stub axle 92 by a second bracket 98 under pin 99. Hydraulic cylinder 95 precludes erratic over-steering of the wheel hub 80.

Figure 5:
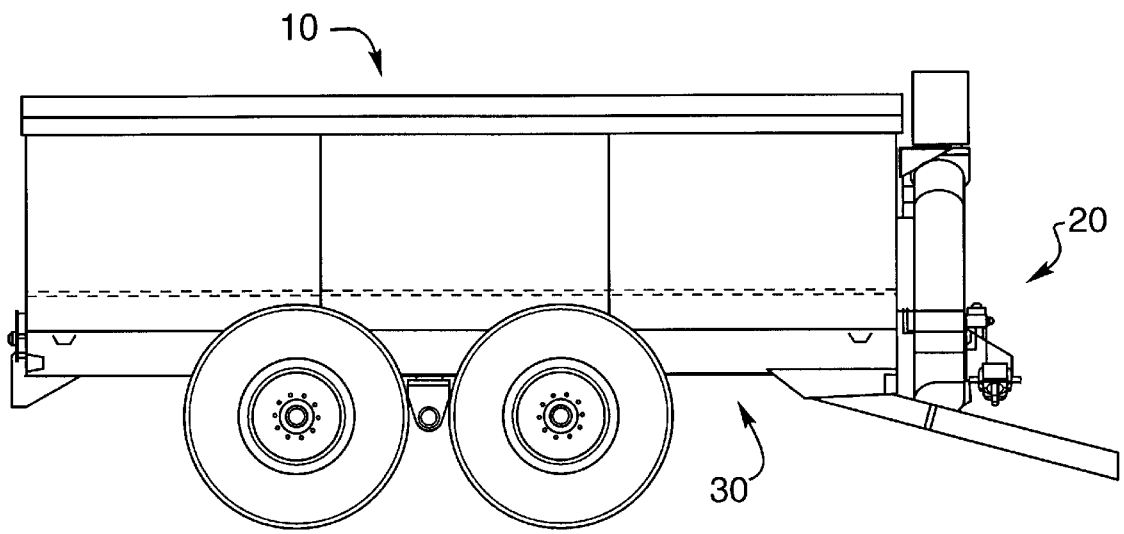
FIG. 5 is a side view of a tandem grain cart built in accordance with the present invention.
Figure 6:
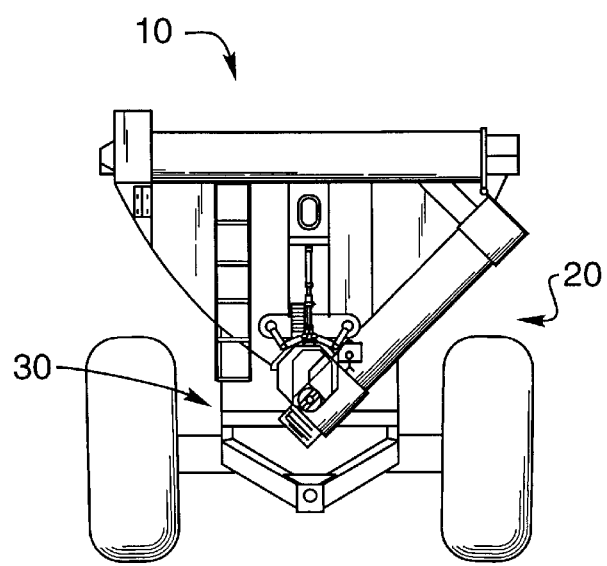
FIG. 6 is a front view of the grain cart shown in FIG. 5.
Figure 7:
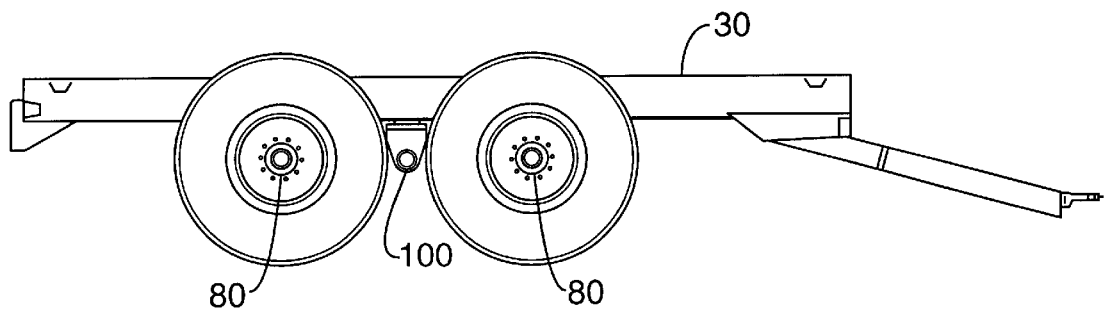
FIG. 7 is a side view of the grain cart shown in FIG. 5 with the grain hopper removed to better show the frame of said grain cart.

FIGS. 5 through 10 show a tandem version of the invention. FIGS. 5 and 6 show the hopper 10, the discharge auger assembly 20, a frame 30, and a tongue 40. The hopper 10, of course, is positioned above and mounted to the frame 30.

In the tandem version of the grain cart, there are four tires mounted to four wheels. Two of the wheels are positioned on one side of the frame 30. The other two wheels are positioned on the opposite side of the frame 30. The back wheels are designed to be steerable while the front wheels are not.

Figure 8:
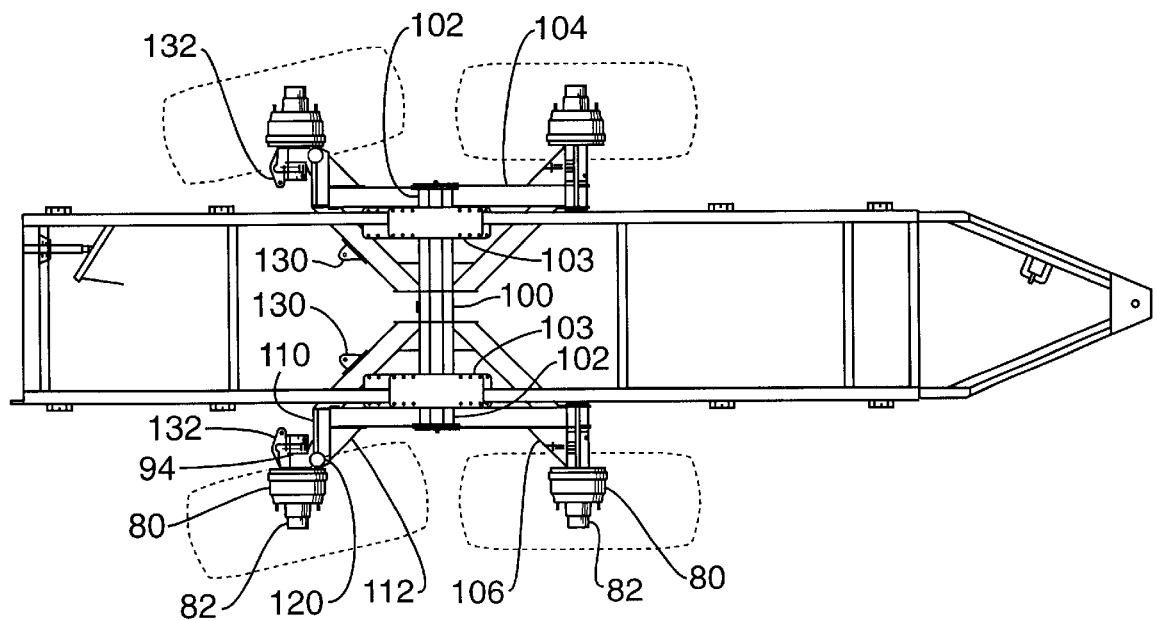
FIG. 8 is a top view of the frame of the grain cart shown in FIG. 5.
Figure 9:
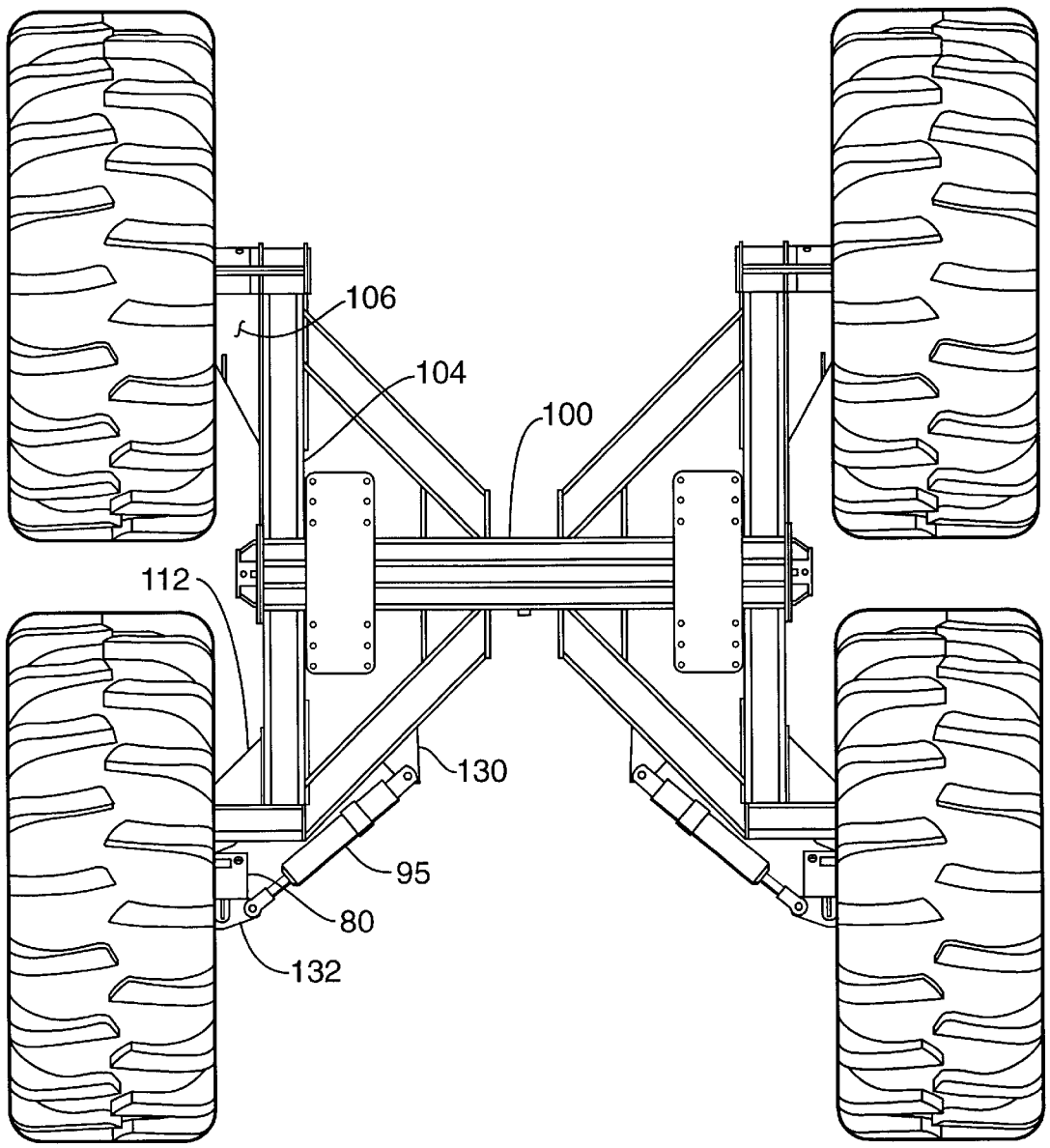
FIG. 9 is a top view of the hub assembly shown at the bottom of FIG. 8.
Figure 10:
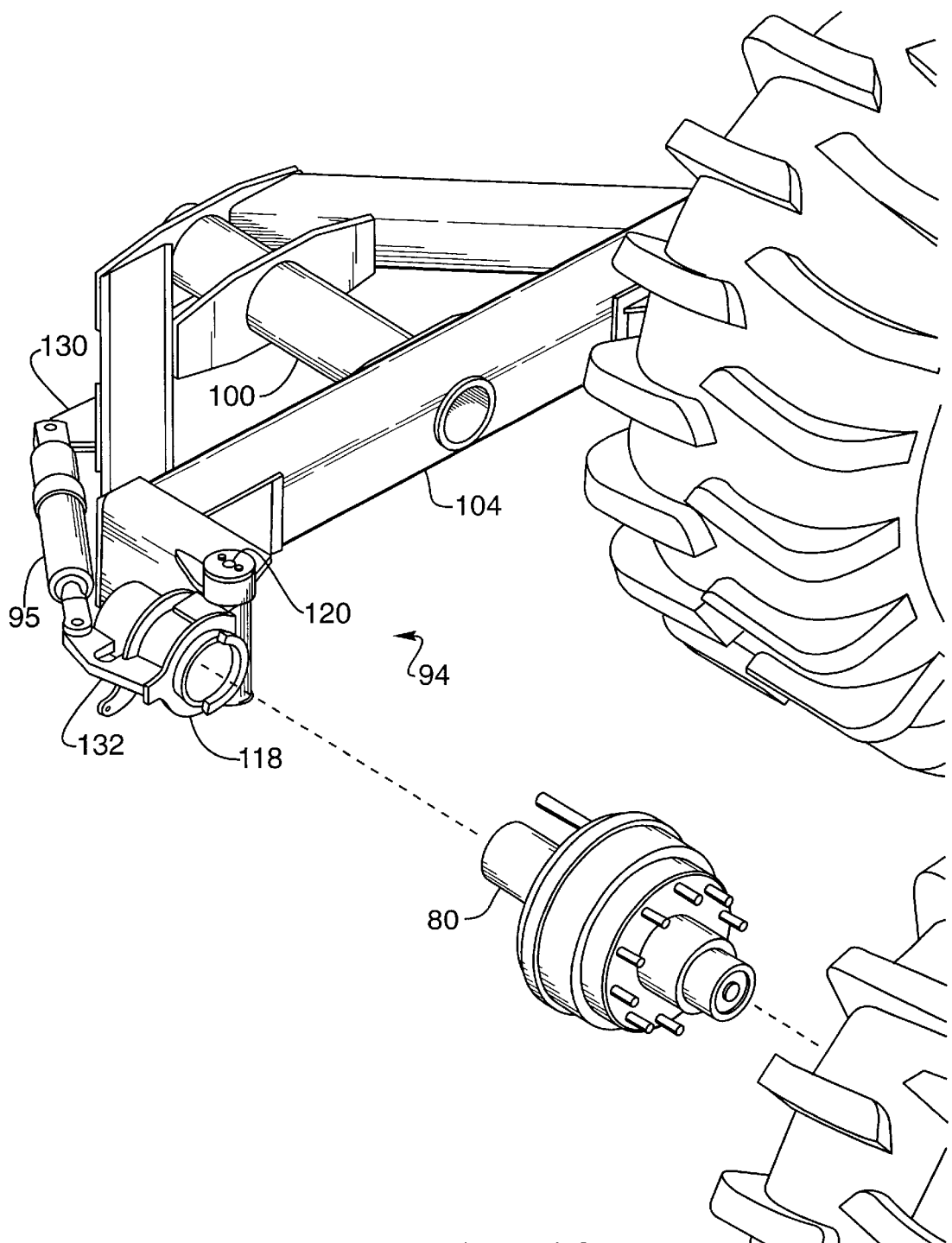
FIG. 10 is a side view of the hub assembly shown in FIG. 9 with the tires and wheels removed.
Figure 11:
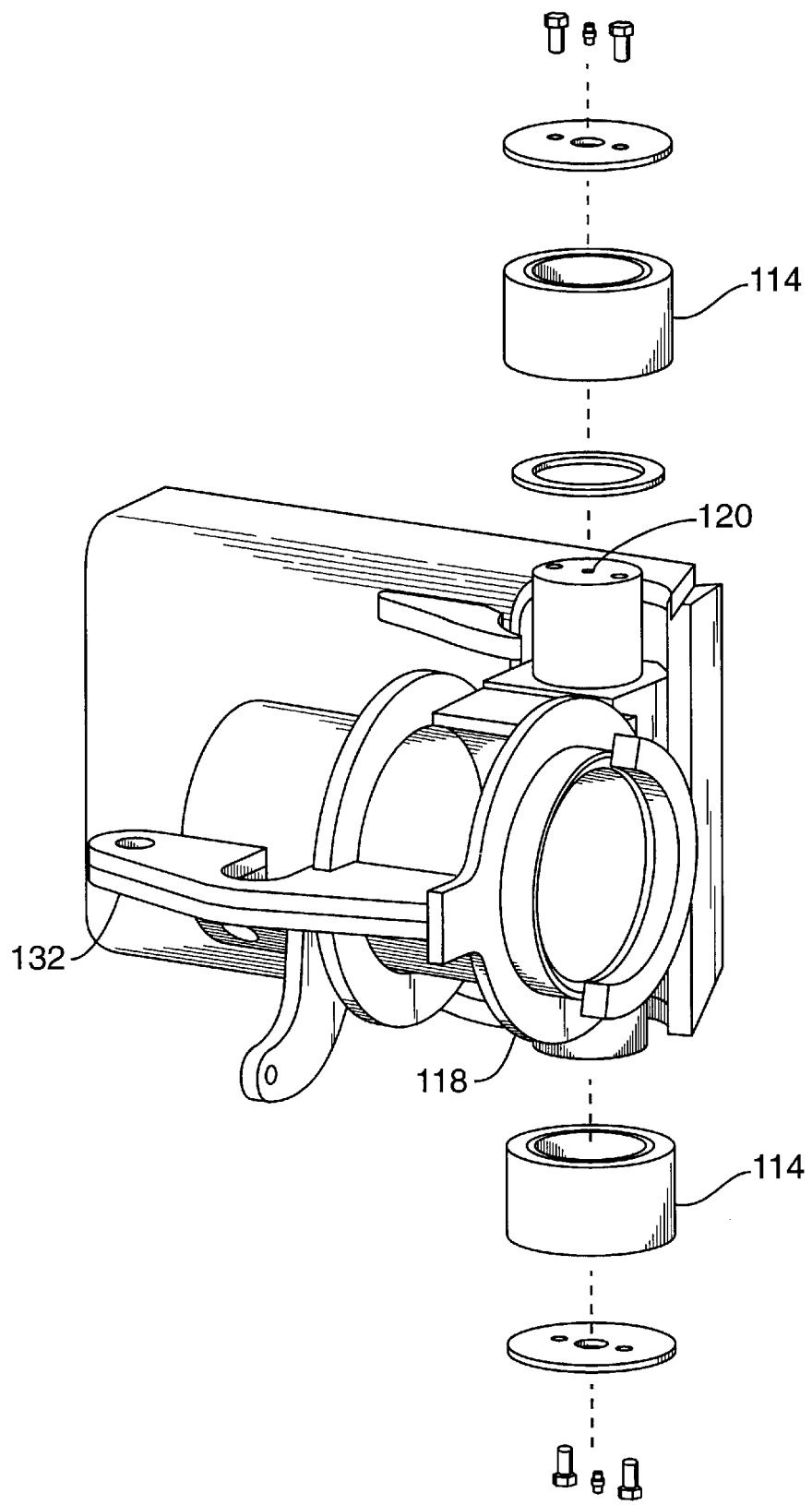
FIG. 11 is an exploded view of the axel holding assembly.

The manner in which the wheels are coupled to the frame 30 is best shown in FIGS. 8–10. As shown in FIG. 8, a cylindrical beam 100 extends in a transverse direction beneath the frame 30 and is coupled to the frame 30 by a plurality of bearings 102. Some of the bearings 102 are held in position by gussets 103. Secured to each end of the cylindrical beam 100 is an oscillating axle support member 104. The oscillating axle support member 104 can rotate about an axis definded by the cylindrical beam 100. A stub axle 80 is secured to the opposite ends of the oscillating axle support member 104. The stub axle 80 secured to the front end of the axle support member is secured in a fixed fashion. The stub axle 80 has a hub 82. The wheel is secured to the hub 82 in a standard fashion. The stub axle 80 secured to the back end of the axle support member is secured in a pivotal, steerable fashion by a hinge assembly 94. To provide rigidity a gusset 106 can be provided to help secure the stub axels 80 to the oscillating arm 104.

The manner in which the steerable wheels are mounted to the back of the oscillating axle support 104 is slightly more complex. First, a mounting plate 110 is secured to the oscillating arm 104. A gusset 112 can be provided to strength the connection between the oscillating arm 104 and the mounting plate 110. The mounting plate 110 includes the collars 114. A steerable stub axle 80 having a collar 118 of its own is secured to pin 120 of mounting plate 110 by hinge 94. Given this configuration, the collars 114 and 118 and the pin 120 act as a hinge so that the steerable stub axle 80 can revolve about the axis of the pin 120 used to join the mounting plate's collar 114 to the steerable stub axle's collar 118. The tires are mounted to the wheels in a standard fashion. Likewise, the wheels are mounted to the hubs (not shown) associated with the steerable stub axles 80 in a standard fashion.

Figure 4:
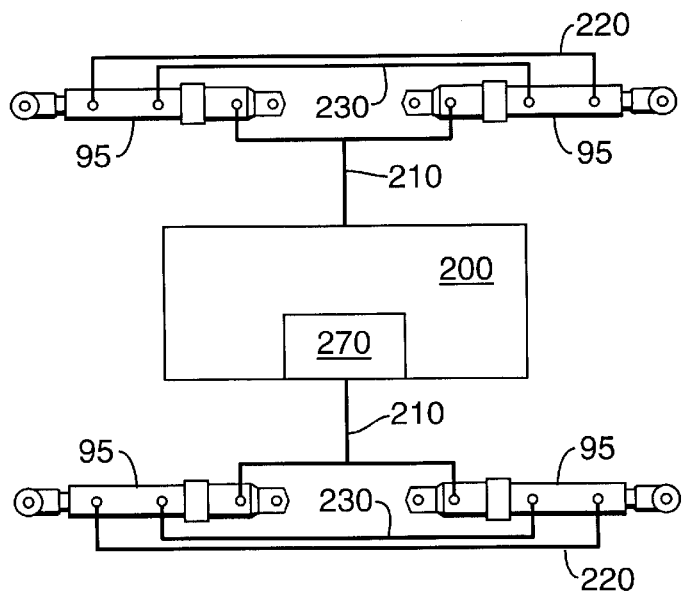
FIG. 4 is a diagram used to hydraulically control the steering of the back wheels or the front and back wheels of the grain carts of the two embodiments shown in the figures.

Steering of the front and back wheels of the tridem embodiment and the back wheels of the tandem embodiment can be non-powered or hydraulically powered. FIG. 4 shows a hydraulic circuit for the steerable wheels of the invention.

To control or buffer the steering of the steerable axles, the frame 30 has a first lug 130 and the steerable axle has a second lug 132. A hydraulic cylinder 95 extends between the two lugs 130 and 132 to control the manner in which the steerable stub axle 80 revolves around the axis of the pin 120. While not shown, a shock absorber can also be positioned between the frame and oscillating axle support arm to limit or control the motion of the oscillating axle support arm.

FIG. 4 shows a hydraulic system 200 having hydraulic fluid used in the steering system. For a six wheel cart the front and rear wheels use the hydraulic system, For a four wheel cart only the rear wheels use the system. Hydraulic line 210 leads form the hydraulic system 200 to the hydraulic cylinders 95. When the grain cart turns the force of the ground exerted on one wheel will pivot the wheel with respect to the frame 30 by an angle related to the tightness of the turn. The turning wheels will pivot relative to the frame 30 and the hydraulic cylinders 95 on the left and right sides will move in opposite directions, with one piston extending and the other contracting. With hydraulic linkage of the wheels as shown in FIG. 4 the wheels will pivot at about the same time to about the same angle to facilitate the turn. The hydraulic lines 220 and 230 are attached to the opposite sides of the hydraulic piston 95 for extending and retracting the piston rod. When the left wheel begins to turn and contracts the piston arm length, hydraulic fluid will flow in line 230 from the left hydraulic piston to the corresponding chamber on the right hydraulic piston tending to turn both wheels to the same angle during the turn. Similarly the hydraulic fluid from the right hydraulic cylinder will be forced into the corresponding chamber of the left hydraulic cylinder in contracting hydraulic line 220 to balance the wheels so that they pivot by the same angle. A damping force for the turns can be provided by an orifice in the lines 220 and 230. Other damping forces may be provided by valves or other means well known in the art.

With a tandem cart only two wheels have the hydraulic system for pivoting the wheels during a turn. For a tridem cart the foremost and rearmost wheels are hydraulically linked as shown in FIG. 4. with the front wheels hydraulically linked to each other and the rear wheels hydraulically linked to each other.

With a power assist the wheels can be steered hydraulically, as in any power steering system, which may be needed for heavily loaded large carts. In the power steering embodiment a hydraulic power steering system 270 can be inserted in the hydraulic system 200 such that with the proper valving and control systems, the power steering will assist in pivoting the wheels of the cart to the proper angle for turning.

Many different embodiments of the hydraulics may be utilized for powered or non-powered steering. The embodiments shown are for illustration of the principle only and not the design of the system. Further the front wheels may use power steering and the rear wheels may have non-powered steering or visa versa.

The hydraulic system 200 can be connected to the tractor hydraulic system or derive its power from the motion of the trailer or other sources.

Further the power steering system 270 need not be a hydraulic system. The power steering can be mechanical, electrical or some hybrid system providing power assistance to the wheels for turning them.

Obviously, many modifications and variations of the present invention are possible in light of the above teachings. It is therefore to be understood that, within the scope of the appended claims, the invention may be practiced otherwise than as specifically described.

What is claimed is:

1. A grain cart comprising:
   a. a frame including a front, a back, a first side, a second side, and a tongue extending from the front of said frame;
   b. a hopper supported by said frame in which grain can be deposited;
   c. a front axle support member pivotally secured to said frame and having a pair of stub axles projecting from and pivotally secured to said front axle support member adjacent the opposite ends of said front axle support member;
   d. a center axle support member pivotally secured to said frame and having a pair of stub axles projecting from and fixedly secured to said center axle support member adjacent the opposite ends of said center axle support member;
   e. a rear axle support member pivotally secured to said frame and having a pair of stub axles projecting from and pivotally secured to said rear axle support member adjacent the opposite ends of said rear axle support member;
   f. a plurality of wheels, at least one wheel rotatably mounted to each of said stub axles;
   g. a hydraulic cylinder connecting the stub axels on each side of the frame to the front axel support members, both hydraulic cylinders on the front axel hydraulically linked to turn the stub axels to the same degree relative the frame of the cart;
   h. a hydraulic cylinder connecting the stub axels on each side of the frame to the rear axel support members, both hydraulic cylinders on the rear axel hydraulically linked to turn the stub axels to the same degree relative the frame of the cart.

2. A grain cart comprising:
   a. a frame including a front, a back, a first side, a second side and a tongue extending from the front of said frame;
   b. a hopper supported by said frame in which grain can be deposited;
   c. a beam having a first end and a second end, said beam being secured to said frame so that the first end of the beam is adjacent the first side of the frame and the second end of the beam is adjacent the second side of the frame;
   d. a first axle support member coupled to said beam adjacent the first end of said beam so that said first axle support member can pivot relative to said frame;
   e. a second axle support member coupled to said beam adjacent to the second end of said beam so that said first axle support member can pivot relative to said frame;
   f. a first pair of stub axles coupled to said first axle support member, one of said first pair being pivotally coupled to said first axle support member and the other of said first pair of stub axles being fixedly coupled to said first axle support member;

g. a second pair of stub axles coupled to said second axle support member, one of said second pair being pivotally coupled to said second axle support member and the other of said second pair of stub axles being fixedly coupled to said second axle support member;

h. plurality of wheels, at least one wheel rotatably mounted to each of said stub axles;

i. a hydraulic cylinder connecting the stub axels of each pivotally coupled wheel to the support member, the hydraulic cylinders hydraulically linked to turn the stub axels to the same degree relative the frame of the cart.

* * * * *